(12) United States Patent
Kitahara

(10) Patent No.: US 10,250,341 B2
(45) Date of Patent: *Apr. 2, 2019

(54) MONITORING APPARATUS, WIRELESS COMMUNICATION SYSTEM, FAILURE FACTOR DECIDING METHOD, AND NON-TRANSITORY COMPUTER READABLE MEDIUM HAVING PROGRAM STORED THEREON

(71) Applicant: NEC Corporation, Tokyo (JP)

(72) Inventor: Yoshinori Kitahara, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/548,967

(22) PCT Filed: Jan. 5, 2016

(86) PCT No.: PCT/JP2016/000022
§ 371 (c)(1),
(2) Date: Aug. 4, 2017

(87) PCT Pub. No.: WO2016/132660
PCT Pub. Date: Aug. 25, 2016

(65) Prior Publication Data
US 2018/0013502 A1    Jan. 11, 2018

(30) Foreign Application Priority Data

Feb. 19, 2015  (JP) ................................ 2015-030605

(51) Int. Cl.
*H04B 7/08*    (2006.01)
*H04B 17/23*   (2015.01)
*H04B 17/318*  (2015.01)

(52) U.S. Cl.
CPC ............... *H04B 17/23* (2015.01); *H04B 7/08* (2013.01); *H04B 7/0825* (2013.01); *H04B 17/318* (2015.01)

(58) Field of Classification Search
None
See application file for complete search history.

(56) References Cited

U.S. PATENT DOCUMENTS

| 4,561,089 A | * | 12/1985 | Rouse | H04J 13/00 370/479 |
| 4,601,047 A | * | 7/1986 | Horwitz | H04J 13/00 370/479 |

(Continued)

FOREIGN PATENT DOCUMENTS

| JP | 9-289482 A | 11/1997 |
| JP | 11-32017 A | 2/1999 |

(Continued)

OTHER PUBLICATIONS

International Search Report of PCT/JP2016/000022, dated Mar. 29, 2016. [PCT/ISA/210].

*Primary Examiner* — Lana N Le
(74) *Attorney, Agent, or Firm* — Sughrue Mion, PLLC

(57) ABSTRACT

There are provided a monitoring apparatus, a wireless communication system, a failure factor deciding method and a program which enable a user to take an appropriate countermeasure for a failure factor which has occurred in a wireless communication apparatus which employs space diversity. The monitoring apparatus (1) includes an obtaining unit (12) and a deciding unit (14). The obtaining unit (12) obtains a history related to a received signal level of a first receiver (22) and a received signal level of a second receiver (24) in a predetermined period from a wireless communication apparatus (20) including the first receiver (22) and the second receiver (24). The deciding unit (14)

(Continued)

decides a factor of a failure that has occurred in the wireless communication apparatus (20) based on the history.

18 Claims, 12 Drawing Sheets

(56) References Cited

U.S. PATENT DOCUMENTS

| | | | | |
|---|---|---|---|---|
| 6,266,528 | B1* | 7/2001 | Farzaneh | H04W 24/00 342/173 |
| 7,778,147 | B2* | 8/2010 | Forenza | H04B 7/0689 370/204 |
| 2004/0136708 | A1* | 7/2004 | Woolf | H04B 17/15 398/22 |
| 2004/0165685 | A1 | 8/2004 | Kitakado | |
| 2013/0272115 | A1* | 10/2013 | Salonidis | H04W 28/18 370/225 |
| 2017/0093607 | A1* | 3/2017 | Kumar | H04L 27/34 |

FOREIGN PATENT DOCUMENTS

| | | | |
|---|---|---|---|
| JP | 2000-332699 | A | 11/2000 |
| JP | 2000332699 | A * | 11/2000 |
| JP | 2004-254111 | A | 9/2004 |
| JP | 2012-74765 | A | 4/2012 |
| JP | 2014-220637 | A | 11/2014 |
| JP | 2014220637 | A * | 11/2014 |

* cited by examiner

HISTORY DATA

| TIME | ERROR TIME Te (s) | NON-OPERATION TIME Tu (s) | OUT OF FRAME TIME Tof (s) | Main_RSLmin (dBm) | Main_RSLmax (dBm) | SD_RSLmin (dBm) | SD_RSLmax (dBm) |
|---|---|---|---|---|---|---|---|
| 2014/01/01_7:00 | | | | | | | |
| 2014/01/01_7:15 | | | | | | | |
| 2014/01/01_7:30 | | | | | | | |
| 2014/01/01_7:45 | | | | | | | |
| 2014/01/01_8:00 | | | | | | | |
| 2014/01/01_8:15 | | | | | | | |
| 2014/01/01_8:30 | | | | | | | |

Fig. 4

FAILURE FACTOR LIST

DISPLAY PERIOD  From 2014/01/01  to 2014/01/31

| APPARATUS NAME | MODEL | SMALL DELAY DIFFERENCE INTERFERENCE FADING | LARGE DELAY DIFFERENCE INTERFERENCE FADING | DEVICE FAILURE |
|---|---|---|---|---|
| APPARATUS A | MODEL A | 60 (min) | 0 (min) | 0 (min) |
| APPARATUS B | MODEL B | 0 (min) | 45 (min) | 0 (min) |
| APPARATUS C | MODEL C | 0 (min) | 0 (min) | 0 (min) |
| APPARATUS D | MODEL D | 0 (min) | 0 (min) | 0 (min) |
| APPARATUS E | MODEL A | 0 (min) | 0 (min) | 30 (min) |

Fig. 10

APPARATUS SPECIFIC CHRONOLOGICAL ORDER LIST

APPARATUS NAME: APPARATUS A

DISPLAY PERIOD From 2014/01/01 to 2014/01/31

| FAILURE FACTOR TYPE | START TIME | END TIME | PERIOD (min) |
|---|---|---|---|
| SMALL DELAY DIFFERENCE INTERFERENCE FADING | 2014/01/01_08:00 | 2014/01/01_08:15 | 15 |
| LARGE DELAY DIFFERENCE INTERFERENCE FADING | 2014/01/04_12:00 | 2014/01/04_12:15 | 15 |
| DEVICE FAILURE | 2014/01/10_18:00 | 2014/01/10_21:00 | 180 |

Fig. 11

MONITORING APPARATUS, WIRELESS COMMUNICATION SYSTEM, FAILURE FACTOR DECIDING METHOD, AND NON-TRANSITORY COMPUTER READABLE MEDIUM HAVING PROGRAM STORED THEREON

CROSS REFERENCE TO RELATED APPLICATIONS

This application is a National Stage of International Application No. PCT/JP2016/000022 filed Jan. 5, 2016, claiming priority based on Japanese Patent Application No. 2015-030605, filed Feb. 19, 2015, the contents of all of which are incorporated herein by reference in their entirety.

TECHNICAL FIELD

The present invention relates to a monitoring apparatus, a wireless communication system, a failure factor deciding method and a program. More particularly, the present invention relates to the monitoring apparatus, the wireless communication system, the failure factor deciding method and the program which monitor history data of a wireless communication apparatus.

BACKGROUND ART

During wireless communication, factors such as natural phenomena and device failures cause failures such as a decrease in a received signal level (RSL) of a wireless communication apparatus, an increase in a bit error and disconnection of communication. Since countermeasures differ among failure factors, it is necessary to specify the failure factor to take a countermeasure for a failure of wireless communication.

In relation to the above technique, for example, Patent Literature 1 discloses a radio apparatus which specifies a failure cause of a radio link between the radio apparatus and another radio station, and takes a countermeasure. The radio apparatus of Patent Literature 1 obtains a characteristic value of statistics information indicating a state of the radio link, and detects a plurality of failure causes associated in advance with the statistics information in specific order based on the characteristics value. Further, the radio apparatus of Patent Literature 1 takes the countermeasure associated in advance with the detected failure cause. In this regard, in Patent Literature 1, a plurality of failure causes include a presence of shadowing, a presence of radio wave noise, a presence of multipath fading, a presence of congestion and a presence of hidden terminals. Further, the detection in the specific order means detecting the presence of radio wave noise after detecting the presence of shadowing, and then detecting the presence of multipath fading, the presence of congestion and the presence of hidden terminals in a predetermined order.

Furthermore, for example, Patent Literature 2 discloses a PM (Performance Monitoring) parameter processing apparatus of a transmitting apparatus. The PM parameter processing apparatus of Patent Literature 2 creates a stop control signal only in a period in which at least one failure occurs, based on at least one of a plurality of failures, sends a stop control signal to a failure detecting unit related to another at least one of a plurality of failures and stops an operation of the failure detecting unit.

CITATION LIST

Non Patent Literature

PTL 1: Japanese Unexamined Patent Application Publication No. 2012-74765
PTL 2: Japanese Unexamined Patent Application Publication No. H11-32017

SUMMARY OF INVENTION

Technical Problem

One of the failure factors is fading which occurs in a radio link due to a natural phenomenon. There are a plurality of types of fading, and countermeasures differ among a plurality of types of fading. Further, fading is, for example, interference facing (multipath fading, and frequency selective fading). The interference fading refers to a phenomenon that a frequency interference where a direct wave (desired wave) and a reflected wave (interference wave) interfere due to reflection on a ground and the like occurs. There are also a plurality of types of interference fading, and countermeasures differ among a plurality of types of interference fading.

Further, when fading such as interference fading occurs, a factor that an error (failure) occurs in a wireless communication apparatus includes factors at a side of the wireless communication apparatus. In this regard, a space diversity (SD) scheme which uses a plurality of antennas (receivers) may be employed to improve quality and reliability of communication in the wireless communication apparatus. In this case, elements unique to the space diversity scheme such as an adjustment failure of intervals among a plurality of antennas may become a factor of an occurrence of a failure. That is, there is a concern that, when fading occurs, if an appropriate countermeasure is not selected from a plurality of countermeasures, it will be difficult to suppress the failure. In this case, a user needs to try a plurality of countermeasures by trial and error, and a time is required to select an appropriate countermeasure.

In this regard, the above Patent Literatures do not disclose failure factors related to the wireless communication apparatus which employs the space diversity. Hence, it is concerned that the techniques according to the above Patent Literatures do not enable the user to take an appropriate countermeasure for a failure factor which has occurred in the wireless communication apparatus which employs the space diversity.

An object of the present invention is to solve such a problem and provide a monitoring apparatus, a wireless communication system, a failure factor deciding method and a program which enable a user to take an appropriate countermeasure for a failure factor which has occurred in a wireless communication apparatus which employs space diversity.

Solution to Problem

A first monitoring apparatus according to the present invention includes: obtaining means for obtaining a history related to a received signal level of one or more first receivers and a received signal level of one or more second receivers in a predetermined period from a wireless communication apparatus including the first receiver and the second receiver; and deciding means for deciding a factor of a failure that has occurred in the wireless communication apparatus based on the history.

Further, the second monitoring apparatus according to the present invention includes display means for displaying a factor of a failure that has occurred in a wireless communication apparatus from a history, wherein the history is obtained from the wireless communication apparatus and indicates at least information related to the failure, and the wireless communication apparatus includes one or more first receivers and one or more second receivers.

Furthermore, a failure factor deciding method according to the present invention includes: obtaining a history related to a received signal level of one or more first receivers and a received signal level of one or more second receivers in a predetermined period from a wireless communication apparatus including the first receiver and the second receiver; and deciding a factor of a failure that has occurred in the wireless communication apparatus based on the history.

Still further, a wireless communication system according to the present invention includes: a wireless communication apparatus that includes one or more first receivers and one or more second receivers; obtaining means for obtaining a history related to a received signal level of the first receiver and a received signal level of the second receiver in a predetermined period from the wireless communication apparatus; and deciding means for deciding a factor of a failure that has occurred in the wireless communication apparatus based on the history.

Moreover, a program according to the present invention causes a computer to execute the steps of: obtaining a history related to a received signal level of one or more first receivers and a received signal level of one or more second receivers in a predetermined period from a wireless communication apparatus including the first receiver and the second receiver; and deciding a factor of a failure that has occurred in the wireless communication apparatus based on the history.

Besides, a third monitoring apparatus according to the present invention determines a type of a communication failure based on an index, wherein the index is obtained based on states of received signals of first and second receivers obtained from a wireless communication apparatus, and the wireless communication apparatus includes the first receiver and the second receiver that are electrically connected to different antennas from each other.

Advantageous Effects of Invention

According to the present invention, it is possible to provide a monitoring apparatus, a wireless communication system, a failure factor deciding method and a program which enable a user to take an appropriate countermeasure for a failure factor which has occurred in a wireless communication apparatus which employs space diversity.

BRIEF DESCRIPTION OF DRAWINGS

FIG. 4 is a view illustrating history data generated by the wireless communication apparatus according to the first exemplary embodiment.

FIG. 10 is a view illustrating a failure factor list displayed by a decision result display unit according to the first exemplary embodiment.

FIG. 11 is a view illustrating an apparatus specific list displayed by the decision result display unit according to the first exemplary embodiment.

DESCRIPTION OF EMBODIMENTS (Outline of Exemplary Embodiment)

Figure 1:
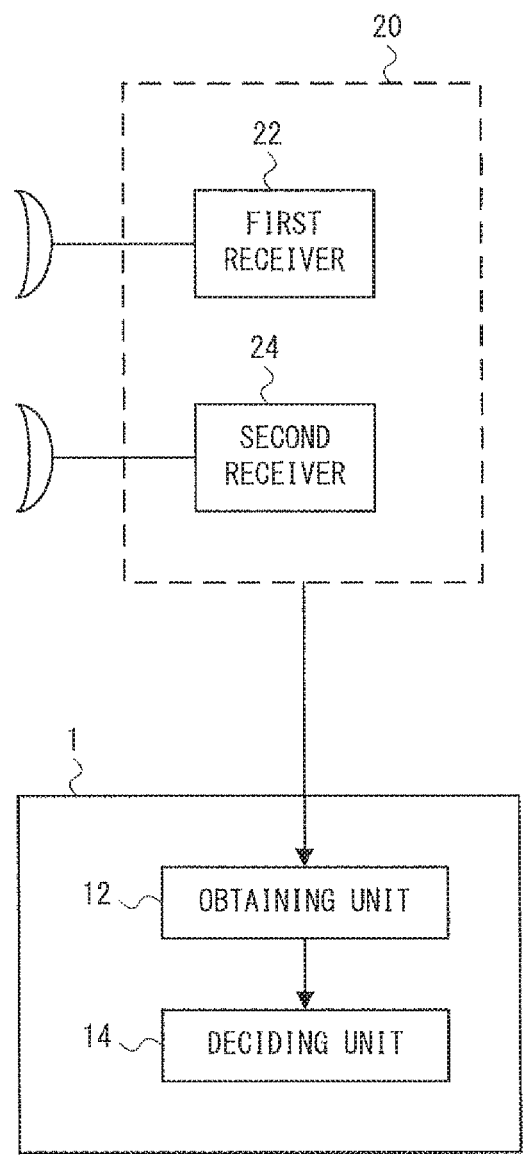
FIG. 1 is a view illustrating an outline of a monitoring apparatus according to the exemplary embodiment.

Prior to giving an explanation of the embodiment, an outline of the exemplary embodiment will be given with reference to FIG. 1. FIG. 1 is a view illustrating the outline of a monitoring apparatus 1 according to the exemplary embodiment. The monitoring apparatus 1 includes an obtaining unit 12 (obtaining means) and a deciding unit 14 (deciding means). The obtaining unit 12 obtains a history related to a received signal level of a first receiver 22 and a received signal level of a second receiver 24 in a predetermined period from a wireless communication apparatus 20 including the first receiver 22 and the second receiver 24. The deciding unit 14 decides a factor of a failure which has occurred in the wireless communication apparatus 20 based on the history. In other words, the deciding unit 14 determines a type of a communication failure based on an index obtained based on states of received signals of the first receiver 22 and the second receiver 24 obtained from the wireless communication apparatus 20 including the first receiver 22 and the second receiver 24.

The monitoring apparatus 1 according to the exemplary embodiment can decide a failure factor which has occurred in a wireless communication apparatus which employs space diversity scheme. Consequently, a user can take an appropriate countermeasure according to the decided failure factor. In this regard, the obtaining unit 12 and the deciding unit 14 may be provided in physically separate apparatuses. Further, a failure factor deciding method including processing performed by each component of the monitoring apparatus 1 can also make it possible to decide a failure factor which has occurred in the wireless communication apparatus which employs the space diversity scheme.

First Exemplary Embodiment

An exemplary embodiment of the present invention will be described below with reference to the drawings.

Figure 2:
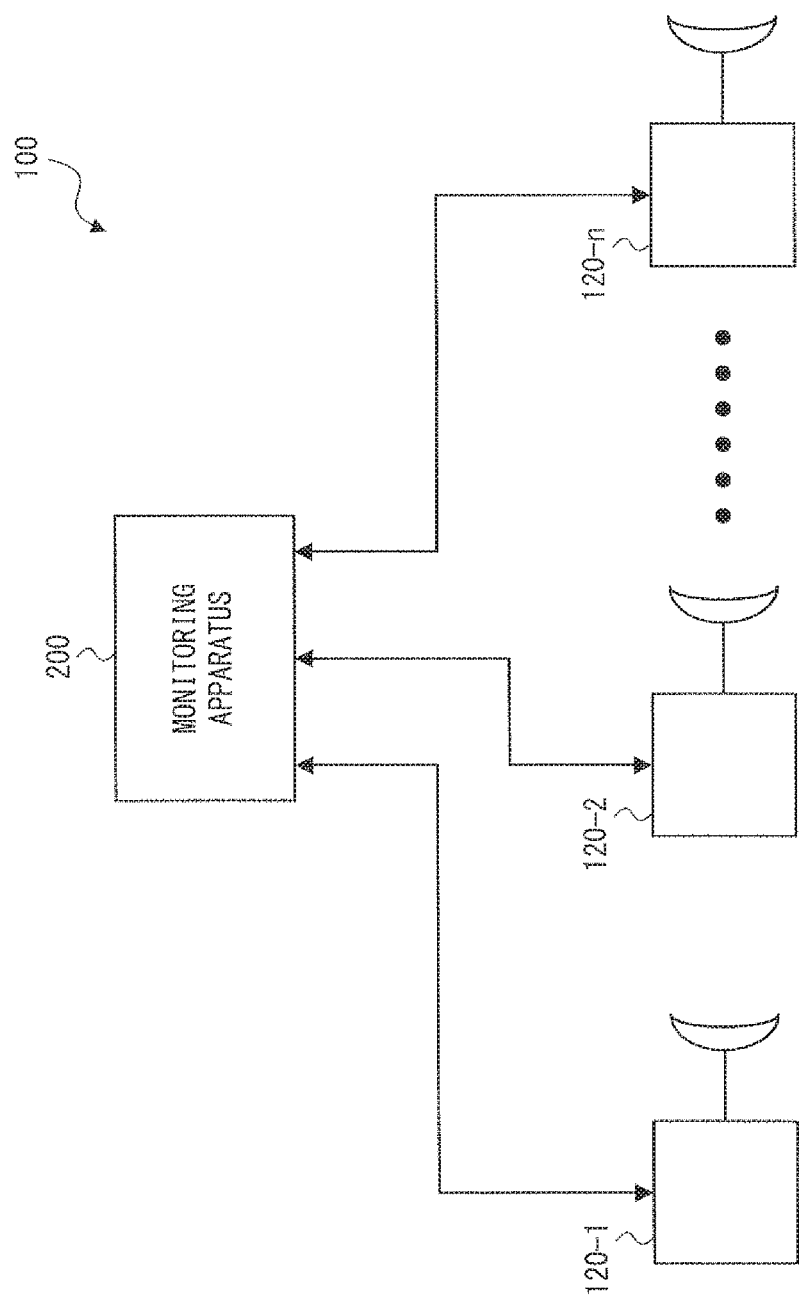
FIG. 2 is a view illustrating a wireless communication system according to a first exemplary embodiment.

FIG. 2 is a view illustrating a wireless communication system 100 according to the first exemplary embodiment. The wireless communication system 100 is configured to include wireless communication apparatuses 120-1 to **120-*n* (n is an integer equal to or more than one), and a monitoring apparatus 200 (corresponding to a monitoring apparatus 1). In this regard, the wireless communication apparatuses 120-1 to 120-*n* which are not distinguished from each other will be collectively referred to as a wireless communication apparatus 120**.

The wireless communication apparatus 120 (e.g., the wireless communication apparatus 120-1) performs wireless communication with another wireless communication apparatus 120 (e.g., the wireless communication apparatus 120-2) via a radio link. The monitoring apparatus 200 has a function of the monitoring apparatus 1 illustrated in FIG. 1. The monitoring apparatus 200 monitors capability of the wireless communication apparatuses 120-1 to **120-*n*, quality of the radio link and an operation status (performance). That is, the monitoring apparatus 200 monitors history data (e.g., PM data) indicating performances of the wireless communication apparatuses 120-1 to 120-*n***.

The wireless communication apparatus 120 employs a space diversity scheme to take countermeasures for natural phenomena such as fading. That is, as illustrated in FIG. 3, the wireless communication apparatus 120 includes a plurality of antennas, and is configured to synthesize received signals received at a plurality of these antennas.

Figure 3:
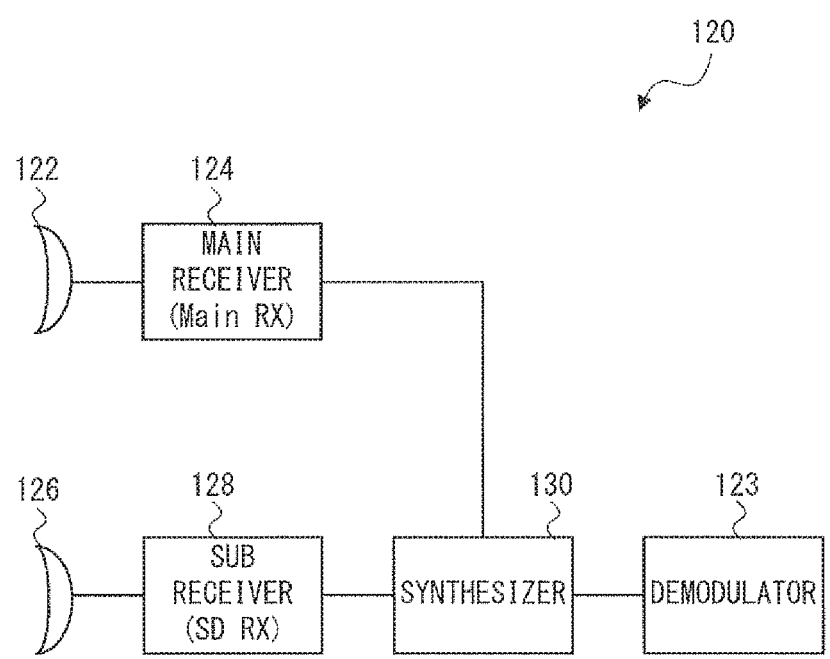
FIG. 3 is a view illustrating a reception side configuration of a wireless communication apparatus according to the first exemplary embodiment.

FIG. 3 is a view illustrating a reception side configuration of the wireless communication apparatus 120 according to the first exemplary embodiment. The wireless communication apparatus 120 includes a main antenna 122, a main receiver 124 (Main_RX), a sub antenna 126, a sub receiver 128 (SD_RX), a synthesizer 130, and a demodulator 132. The main antenna 122 may be installed at a position higher than that of the sub antenna 126 in the wireless communication apparatus 120. In this regard, a plurality of the main antennas 122 and the main receivers 124 may be provided. Similarly, a plurality of the sub antennas 126 and the sub receivers 128 may be provided.

The main receiver 124 is electrically connected to the main antenna 122. The main receiver 124 receives a radio wave transmitted from the transmission side wireless communication apparatus 120 via the main antenna 122. Further, the main receiver 124 measures a level (main received signal level) of the received signal (main received signal) of the main receiver 124. That is, the main received signal level is RSL (Main_RSL) of the main receiver 124.

The sub receiver 128 is electrically connected to the sub antenna 126. The sub receiver 128 receives a radio wave transmitted from the transmission side wireless communication apparatus 120 via the sub antenna 126. Further, the sub receiver 128 measures a level (sub received signal level) of the received signal (sub received signal) of the sub receiver 128. That is, the sub received signal level is RSL (SD_RSL) of the sub receiver 128.

The synthesizer 130 synthesizes the main received signal of the main receiver 124 and the sub received signal of the sub receiver 128. The demodulator 132 performs processing of demodulating the radio wave by using the received signal synthesized by the synthesizer 130.

In this regard, in the wireless communication apparatus 120, the sub received signal of the sub receiver 128 plays a role of complementing the main received signal of the main receiver 124. More specifically, when Main_RSL and SD_RSL are inversely correlated (i.e., correlation coefficients of both are low), even if Main_RSL is lowered due to fading etc., SD_RSL is not lowered. Hence, in this case, the sub received signal functions to complement the main received signal. Meanwhile, when Main_RSL and SD_RSL are correlated (i.e., the correlation coefficients of both are high), if Main_RSL is lowered due to a change in natural environment such as fading, SD_RSL is also lowered. Hence, in this case, the sub received signal does not function to complement the main received signal.

The wireless communication apparatus 120 generates history data illustrated in FIG. 4 per predetermined period. The history data may be performance monitoring data (PM data) indicating capability or an operation status or the like of each wireless communication apparatus 120. The wireless communication apparatus 120 measures data (performance parameter) indicating capability, quality of the radio link and the operation status and the like per predetermined period. Further, the wireless communication apparatus 120 generates a period file including a measurement value measured in this period.

FIG. 4 is a view illustrating history data generated by the wireless communication apparatus 120 according to the first exemplary embodiment. In an example in FIG. 4, a period file (15-minute file) is generated per a period of 15 minutes defined by an ITU-T (International Telecommunication Union Telecommunication Standardization Sector) advisory. The period file includes at least an error time Te (first failure occurrence time), a non-operation time Tu (second failure occurrence time), an out of frame second Tof, Main_RSLmin, Main_RSLmax, SD_RSLmin and SD_RSLmax. That is, the wireless communication apparatus 120 measures at least the error time, the non-operation time, the out of frame second, Main_RSLmin, Main_RSLmax, SD_RSLmin and SD_RSLmax per 15-minute period.

The error time Te(s) is a time of the 15-minute period at which an error occurs in data received during wireless communication. For example, the error time may be a time at which a bit error rate (BER) exceeds a predetermined threshold. Further, the error time may be, for example, SES (Severely Errored Seconds) or a SEP (Severely Errored Period) defined by ITU-T or may be a total time of the SES and the SEP.

The non-operation time Tu (s) is a time of the 15-minute period in which the wireless communication apparatus 120 cannot perform wireless communication since the radio link is not active. For example, the non-operation time may be UAS (Unavailable Seconds) defined by ITU-T. In this regard, the error time and the non-operation time are not counted redundantly.

In this regard, the error time Te and the non-operation time Tu indicate times at which some failures occur. That is, the error time Te is the time at which a data error (bit error) failure occurs. Further, the non-operation time Tu is the time at which a failure that wireless communication is impossible occurs. In this regard, the failure that wireless communication is impossible is a higher degree failure than the data error failure. Further, a sum of the error time Te and the non-operation time Tu may be a failure occurrence time Tf (=Te+Tu).

The out of frame second (OFS) Tof (s) is a time of the 15-minute period at which the reception side wireless communication apparatus 120 cannot synchronize frames and recognize a radio signal. For example, this out of frame (OOF) occurs when, for example, a shield enters a channel (radio channel) between the transmission side wireless communication apparatus 120 and the reception side wireless communication apparatus 120. That is, the out of frame second Tof indicates a time at which some failure occurs.

In this regard, the out of frame second Tof can be detected even when the error time Te or the non-operation time Tu is not detected or is detected only in a short time. When, for example, a shield abruptly enters a channel, the error time Te or the non-operation time Tu is not likely to be detected or is likely to be detected only in a short time. However, the out of frame second Tof can be detected by the reception side wireless communication apparatus 120. Hence, as described below, in the exemplary embodiment, even when the failure occurrence time Tf (=Te+Tu) is short, if the out of frame second Tof is detected, it is estimated that a failure (e.g., interference fading) is likely to have occurred.

Main_RSLmin (dBm) is a minimum value of the main received signal level Main_RSL in the 15-minute period. Further, Main_RSLmax (dBm) is a maximum value of the main received signal level Main_RSL in the 15-minute period. That is, Main_RSLmin and Main_RSLmax are information related to the received signal level of the main receiver 124.

SD_RSLmin (dBm) is a minimum value of the sub received signal level SD_RSL in the 15-minute period. Further, SD_RSLmax (dBm) is a maximum value of the sub received signal level SD_RSL in the 15-minute period. That is, SD_RSLmin and SD_RSLmax are information related to the received signal level of the sub receiver 128.

Further, the wireless communication apparatus 120 generates a period file including these measurement values per 15-minute period. FIG. 4 illustrates the example of a period file generated at 7:00 on Jan. 1, 2014, a period file generated at 7:15 on Jan. 1, 2014 and a period filed generated at 7:30 on Jan. 1, 2014. For example, the period file generated at 7:00 on Jan. 1, 2014 includes the error time Te, the non-operation time Tu, the out of frame second Tof, Main_RSLmin, Main_RSLmax, SD_RSLmin and SD_RSLmax measured in a 15-minute period from 6:45 to 7:00 on Jan. 1, 2014.

Figure 5:
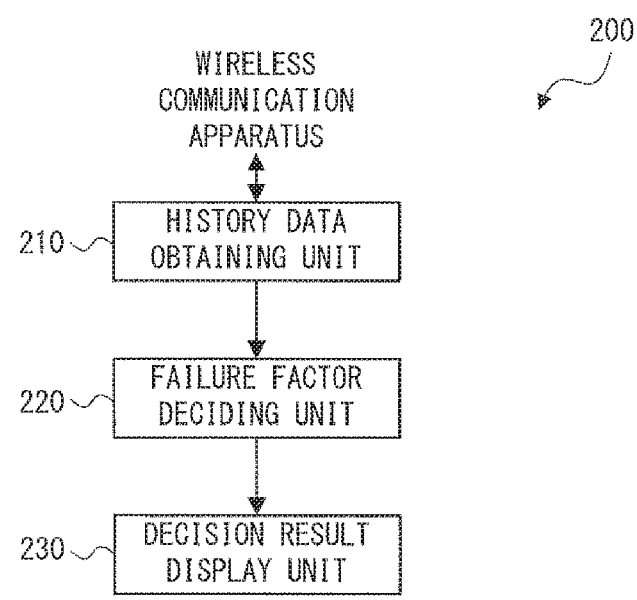
FIG. 5 is a functional block diagram illustrating a configuration of the monitoring apparatus according to the first exemplary embodiment.
Figure 6:
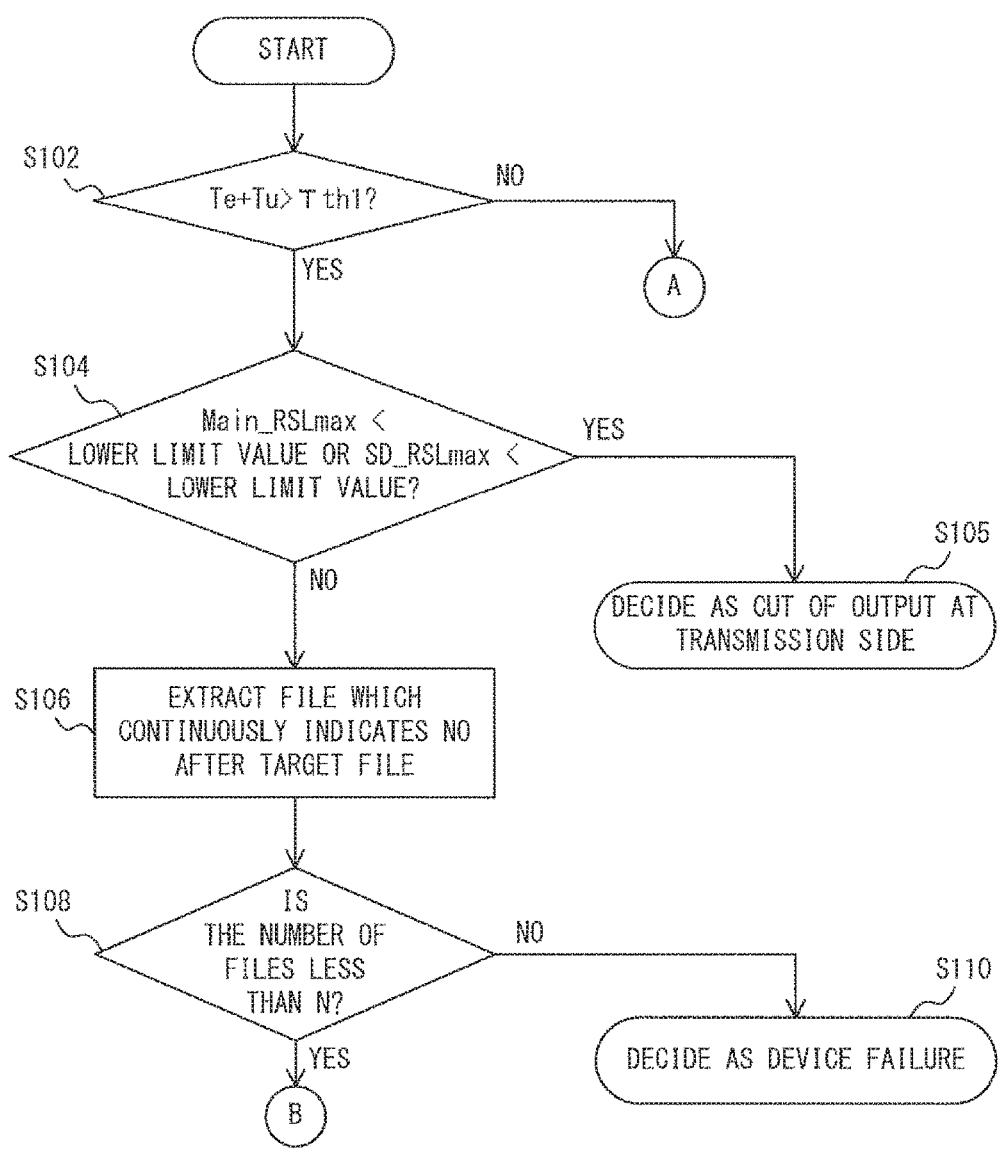
FIG. 6 is a flowchart illustrating processing performed by a failure factor deciding unit according to the first exemplary embodiment.
Figure 7:
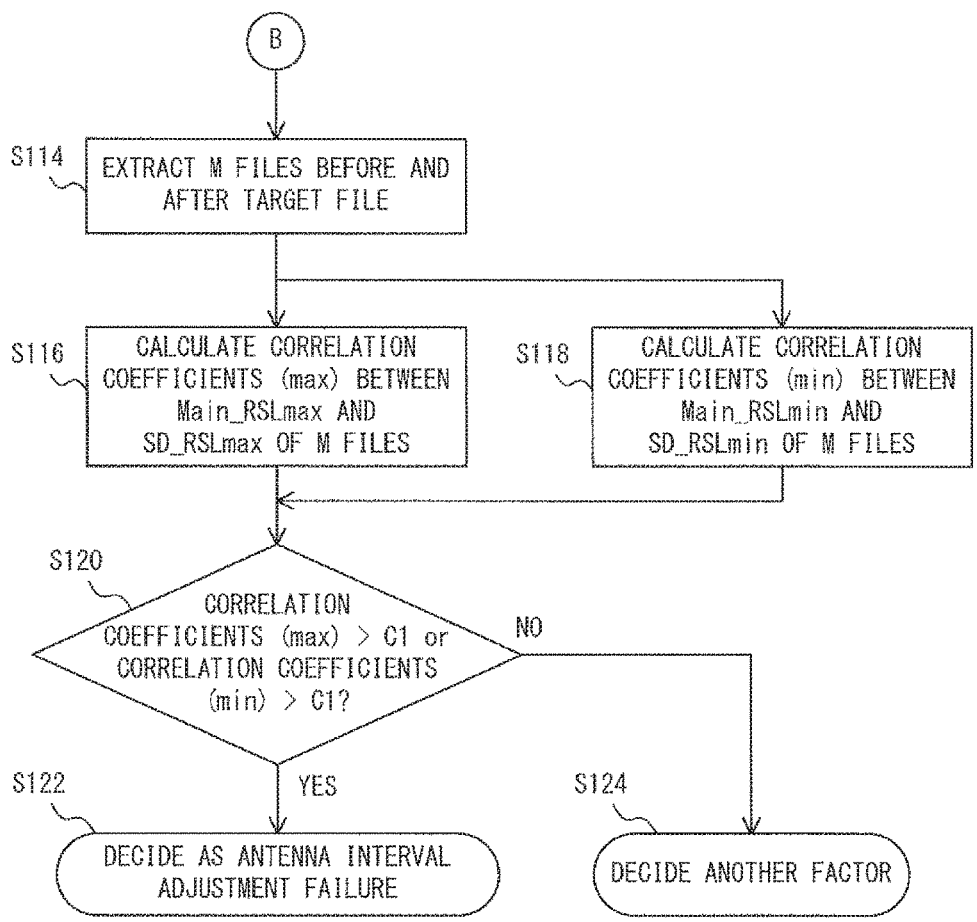
FIG. 7 is a flowchart illustrating processing performed by the failure factor deciding unit according to the first exemplary embodiment.

FIG. 5 is a functional block diagram illustrating a configuration of the monitoring apparatus 200 according to the first exemplary embodiment. The monitoring apparatus 200 includes a history data obtaining unit 210, a failure factor deciding unit 220 and a decision result display unit 230 (display means). The monitoring apparatus 200 decides a failure factor related to this wireless communication apparatus 120 by using these components. Further, the monitoring apparatus 200 displays the decided failure factor on a display screen such as a monitor. In this regard, the monitoring apparatus 200 may include not only the components illustrated in FIG. 5 but also a computer function. That is, the monitoring apparatus 200 may include a computing apparatus such as a CPU, a storage apparatus such as a memory, a communication apparatus which communicates with another apparatus such as the wireless communication apparatus 120, input apparatuses such as a keyboard and a mouse and an output apparatus such as a monitor.

The history data obtaining unit 210 corresponds to an obtaining unit 12 illustrated in FIG. 1. The history data obtaining unit 210 obtains the history data illustrated in FIG. 4 from the wireless communication apparatuses 120-1 to 120-n, and outputs the history data to the failure factor deciding unit 220. More specifically, the history data obtaining unit 210 accesses each of the wireless communication apparatuses 120-1 to 120-n at a predetermined time (e.g., 24:00) of one day, and obtains the history data generated by each of the wireless communication apparatuses 120-1 to 120-n. In this case, the history data obtaining unit 210 may control the communication apparatus provided in the monitoring apparatus 200, and obtain the history data.

The failure factor deciding unit 220 corresponds to a deciding unit 14 illustrated in FIG. 1. The failure factor deciding unit 220 decides a failure factor related to each wireless communication apparatus 120 per wireless communication apparatus 120 by using the history data related to each wireless communication apparatus 120 and obtained by the history data obtaining unit 210. Further, the failure factor deciding unit 220 outputs data indicating a decision result to the decision result display unit 230. This will be described in detail below. The decision result display unit 230 causes the display apparatus provided in the monitoring apparatus 200 or another apparatus to display the decision result obtained by the failure factor deciding unit 220. This will be described in detail below.

FIGS. 6, 7, 8 and 9 are flowcharts illustrating processing performed by the failure factor deciding unit 220 according to the first exemplary embodiment. The failure factor deciding unit 220 performs the processing illustrated in the flowcharts in FIGS. 6, 7, 8 and 9 for each of the wireless communication apparatuses 120-1 to 120-n.

The failure factor deciding unit 220 decides whether or not a sum of the error time Te and the non-operation time Tu is higher than a predetermined threshold time Tth1 in a processing target period file (i.e., period file to be a subject for processing) (step S102). In this regard, Tth1 is a time at which a failure factor, such as fading, which is not abrupt is estimated to have occurred and may be, for example 20 seconds. This Tth1 can be arbitrarily set in advance by the user.

When the sum of the error time Te and the non-operation time Tu is higher than the threshold time Tth1 (YES in S102), the failure factor deciding unit 220 decides that some failure has occurred. Next, the failure factor deciding unit 220 decides whether or not at least one of Main_RSLmax and SD_RSLmax is smaller than a lower limit value in the target period file (step S104). In this regard, the "lower limit value" is a value set per wireless communication apparatus 120, and RSLmax does not usually go below this lower limit value.

That at least one of Main_RSLmax and SD_RSLmax is smaller than the lower limit value (YES in S104) means that the transmission side wireless communication apparatus 120 does not transmit a radio signal. Hence, the failure factor deciding unit 220 decides cut of an output of the transmission side wireless communication apparatus 120 as a failure factor (step S105).

When Main_RSLmax and SD_RSLmax are the lower limit value or more (NO in S104), the failure factor deciding unit 220 extracts a period file which continuously indicates NO in processing in S104 after the processing target file (step S106). When, for example, the period file of "2014/01/01_7:00" in FIG. 4 is a processing target, the failure factor deciding unit 220 extracts period files which are subsequently continuing period files, which indicate Te+Tu>Tth1 and whose Main_RSLmax and SD_RSLmax are the lower limit value or more. For example, when Te+Tu>Tth1 holds and Main_RSLmax and SD_RSLmax are the lower limit value or more in the period files of "2014/01/01_7:15" to "2014/01/01_8:00", the failure factor deciding unit 220 extracts these continuous period files. In this case, when Te+Tu>Tth1 does not hold in the period file of "2014/01/01_8:15", the failure factor deciding unit 220 finishes the extraction processing.

Next, the failure factor deciding unit 220 decides whether or not the number of extracted period files is less than N (N is an integer equal to or more than two) (step S108). When the number of period files is N or more (NO in S108), the failure factor deciding unit 220 decides a device failure (a failure of the decision target wireless communication apparatus 120) as the failure factor (step S110). In this regard, N is a value which may be an estimated as a device failure when N period files continuously indicate an occurrence of a failure factor. In other words, when period files continuously indicate the occurrence of the failure factor for N×15 (minutes), a natural phenomenon which continuously occurs for N×15 (minutes) is very rare, and therefore this failure factor is estimated as a device failure. For example, a natural phenomenon which continuously occurs for six hours (=15 minutes×24) hardly occurs, and therefore N=24 may hold. In this regard, this N can be arbitrarily set by the user. Further, the "device failure" includes displacement of a direction of the antennas of the wireless communication apparatus 120 due to a gust of wind or the like.

When the number of period files is less than N (YES in S108), the failure factor deciding unit 220 extracts M (M is an integer equal to or more than two) period files in total before and after the target period file (step S114). In this case, M may be a value which realizes an appropriate number of samples when correlation coefficients are calculated by processing in S116 and S118 described below. When, for example, M=25 holds, the failure factor deciding unit 220 extracts the target period file and period files which are obtained during three hours (=15 minutes×12) before and after the target period file. When, for example, the target period file is "2014/01/01_7:00", the failure factor deciding unit 220 extracts 25 period files in total including the target period file, the period files which are obtained during three hours before this period file and the period files which are obtained during three hours after this period file. In this regard, this M can be arbitrarily set in advance by the user.

Next, the failure factor deciding unit 220 calculates correlation coefficients (correlation coefficient (max)) indicating correlations between Main_RSLmax and SD_RSLmax of the M period files (step S116). In other words, the failure factor deciding unit 220 calculates an index obtained from both of the received signal levels of the main receiver 124 and the sub receiver 128 by using both of the received signal levels. In this regard, the "index" is, for example, obtained from states of the received signals of the main receiver 124 and the sub receiver 128. More specifically, the failure factor deciding unit 220 calculates correlation coefficients (max) between Main_RSLmax (i.e., M Main_RSLmax values) of the respective M period files, and SD_RSLmax (i.e., M SD_RSLmax values) of the respective M period files.

For example, "2014/01/01_7:00" is a processing target period file. In this case, 25 files in total including period files which are obtained during three hours before 7:00 on Jan. 1, 2014, the processing target period file and period files which are obtained during three hours after 7:00 on Jan. 1, 2014 are period files #1 to #25. Further, Main_RSLmax of the period files #1 to #25 are Main_RSLmax #1 to Main_RSLmax #25, respectively. Furthermore, SD_RSLmax of the period files #1 to #25 are SD_RSLmax #1 to SD_RSLmax #25, respectively. In this case, the failure factor deciding unit 220 calculates correlation coefficients (max) between Main_RSLmax #1 to Main_RSLmax #25 and SD_RSLmax #1 to SD_RSLmax #25.

Further, the failure factor deciding unit 220 calculates correlation coefficients (correlation coefficients (min)) indicating correlations between Main_RSLmin and SD_RSLmin of the M period files (step S118). In other words, the failure factor deciding unit 220 calculates an index obtained from both of the received signals levels of the main receiver 124 and the sub receiver 128 by using both of the received signal levels. This processing in S118 is performed in parallel to the processing in S116 or before or after the processing in S116. More specifically, the failure factor deciding unit 220 calculates correlation coefficients (min) between Main_RSLmin (i.e., M Main_RSLmin values) of the respective M period files and SD_RSLmin (i.e., M SD_RSLmin values) of the respective M period files.

For example, in the above example, Main_RSLmin of the period files #1 to #25 are Main_RSLmin #1 to Main_RSLmin #25, respectively. Further, SD_RSLmin of the period files #1 to #25 are SD_RSLmin #1 to SD_RSLmin #25, respectively. In this case, the failure factor deciding unit 220 calculates correlation coefficients (min) between Main_RSLmin #1 to Main_RSLmin #25 and SD_RSLmin #1 to SD_RSL min #25.

Next, the failure factor deciding unit 220 decides whether the correlation coefficient (max) calculated by the processing in S116 is higher than C1 or the correlation coefficient (min) calculated by the processing in S118 is higher than C1 (step S120). In this regard, C1 is a threshold for deciding whether or not a sub received signal functions to complement a main received signal and is, for example, C1=0.8. In this regard, this C1 can be arbitrarily set in advance by the user.

When the correlation coefficient (max) is higher than C1 or the correlation coefficient (min) is higher than C1 (YES in S120), the failure factor deciding unit 220 decides that Main_RSL and SD_RSL are highly correlated with each other to such a degree that the sub received signal does not function to complement a main received signal. In this regard, when, for example, an interval between the main antenna 122 and the sub antenna 126 is narrow, i.e., when, for example, an antenna interval causes an adjustment failure, both a main received signal and a sub received signal are influenced by natural environment, and Main_RSL and SD_RSL are highly correlated with each other. Hence, the failure factor deciding unit 220 decides that a failure factor in the wireless communication apparatus 120 is the adjustment failure of the interval between the main antenna 122 and the sub antenna 126 (step S122). In this case, the user may adjust (widen or the like) an interval between the main antenna 122 and the sub antenna 126.

Meanwhile, when the correlation coefficient (max) is C1 or less and the correlation coefficient (min) is C1 or less (NO in S120), the failure factor deciding unit 220 decides that Main_RSL and SD_RSL are lowly correlated with each other to such a degree that the sub received signal functions to complement the main received signal. Hence, the failure factor deciding unit 220 decides the failure factor in the wireless communication apparatus 120 as another factor (step S124).

In this regard, since the sum of the error time Te and the non-operation time Tu is higher than the threshold time Tth1 (YES in S102), a failure (error) occurs in the wireless communication apparatus 120 in a period corresponding to the processing target period file. A factor of this failure is decided to be due to a natural phenomenon such as fading. In this regard, the fading includes the above interference fading and, in addition, attenuation fading (flat fading) and duct type fading.

The attenuation fading is a phenomenon that a clearance between a radio wave and a ground is insufficient due to fluctuation of a K value and therefore a radio wave attenuates and a sufficient RSL cannot be secured. The duct type fading is a phenomenon that intense fluctuation of the K value simultaneously causes clearance insufficiency and a frequency interference. Countermeasures differ among these interference fading, attenuation fading and duct type fading. The countermeasures are, for example, the following methods.

Interference Fading:
Antenna tilt-up is applied.
An interval between a main antenna and a sub (SD) antenna is adjusted.
A frequency band is changed.
Attenuation Fading
An antenna position is lifted.
An antenna diameter is increased.
A relay station is installed to shorten a channel.
Duct Type Fading:
An antenna position is lifted.
An antenna diameter is increased, and antenna tilt-up is applied.
A relay station is installed at a high place to shorten a channel, and a difference in height is provided to the channel.
A route between wireless communication apparatuses is changed.

In this regard, the countermeasure for the interference fading for "adjusting the interval between the main antenna and the sub (SD) antenna" corresponds to "the adjustment failure of the antenna failure" decided by processing in S122. Hence, the failure factor deciding unit 220 decides that the failure factor in the wireless communication apparatus 120 is a physical factor (an antenna angle failure or a frequency band setting failure) corresponding to countermeasures other than the above countermeasure of interference fading, or a factor due to attenuation fading or duct type fading. In this regard, the failure factor deciding unit 220 may decide a factor other than fading as a failure factor.

Thus, by applying the space diversity scheme to the wireless communication apparatus 120, it is possible to decide a correlation between Main_RSL and SD_RSL. Consequently, the user can select a countermeasure for "adjusting the interval between the main antenna and the sub (SD) antenna" from a plurality of countermeasures of interference fading.

When the sum of the error time Te and the non-operation time Tu is the threshold time Tth1 or less (NO in S102), the failure factor deciding unit 220 extracts a period file whose out of frame second Tof is longer than a predetermined threshold time Tth2 as a failure factor decision target. That is, the failure factor deciding unit 220 extracts the period file of Tof>Tth2 as a processing target (step S202). In this regard, Tth2 is a time at which a failure factor such as some abrupt fading is estimated to have occurred, and may be, for example, 0 second. This Tth2 can be arbitrarily set by the user.

The failure factor deciding unit 220 extracts the period files which continuously indicate Tof>Tth2 after the processing target period file (step S206). When, for example, the period file of "2014/01/01_7:00" in FIG. 4 is the processing target, the failure factor deciding unit 220 extracts the period files which are subsequently continuous period files, indicate Te+Tu≤Tth1 and Tof>Tth2 in the respective period files in a similar way to the processing in S106.

Next, the failure factor deciding unit 220 decides whether or not the number of extracted period files is less than N (step S208). When the number of period files is N or more (NO in S208), the failure factor deciding unit 220 decides the failure factor as a device failure (a failure of the decision target wireless communication apparatus 120) in a similar way to S110 (step S210). In this regard, N is a value which is estimated as a device failure when N period files continuously indicate an occurrence of a failure factor, and is, for example, N=24 yet is not limited to this. In this regard, the "device failure" includes disconnection of a channel, too.

When the number of period files is less than N (YES in S208), the failure factor deciding unit 220 extracts M (M is an integer equal to or more than two) period files in total before and after the target period file in a similar way to the processing in S114 (step S214). In this regard, M may be a value which realizes an appropriate number of samples when the correlation coefficient is calculated by processing in S216 and S218 described below and is, for example, M=25 yet is not limited to this.

Next, the failure factor deciding unit 220 calculates the correlation coefficients (correlation coefficient (max)) indicating correlations between Main_RSLmax and SD_RSLmax of the M period files (step S216). In other words, the failure factor deciding unit 220 calculates an index obtained from both of the received signal levels of the main receiver 124 and the sub receiver 128 by using both of the received signal levels. More specifically, the failure factor deciding unit 220 calculates the correlation coefficients (max) between Main_RSLmax (i.e., the M Main_RSLmax values) of the respective M period files and SD_RSLmax (i.e., the M SD_RSLmax values) of the respective M period files in a similar way to S116.

Further, the failure factor deciding unit 220 calculates the correlation coefficients (correlation coefficients (min)) indicating the correlations between Main_RSLmin and SD_RSLmin of the M period files (step S218). In other words, the failure factor deciding unit 220 calculates an index obtained from both of the received signal levels of the main receiver 124 and the sub receiver 128 by using both of the received signal levels. This processing in S218 is performed in parallel to processing in S216 or before or after the processing in S216. More specifically, in a similar way to S118, the failure factor deciding unit 220 calculates the correlation coefficients (min) between Main_RSLmin (i.e., the M Main_RSLmin values) of the respective M period files and SD_RSLmin (i.e., the M SD_RSLmin values) of the respective M period files.

Next, the failure factor deciding unit 220 decides whether the correlation coefficient (max) calculated by the processing in S216 is higher than C2 or the correlation coefficient (min) calculated by the processing in S218 is higher than C2 (step S220). In this regard, C2 is a threshold for distinguishing whether or not a sub received signal functions to complement a main received signal and is, for example, C2=0.8. In this regard, this C2 can be arbitrarily set by the user.

When the correlation coefficient (max) is C2 or less and the correlation coefficient (min) is C2 or less (NO in S220), the failure factor deciding unit 220 decides a failure factor as a device failure (step S210). When the correlation coefficient (max) is C2 or less and the correlation coefficient (min) is C2 or less, Main_RSL and SD_RSL are not highly correlated with each other. That is, in this case, the sub received signal functions to complement the main received signal, and therefore it is estimated that the wireless communication apparatus 120 is not influenced by fading. Despite this, Tof (OFS) is higher than 0, i.e., out of frame occurs. This means that this failure factor is estimated not to be caused by environment of a channel. Hence, the failure factor deciding unit 220 decides the failure factor as the device failure.

Meanwhile, when the correction coefficient (max) is higher than C2 or the correlation coefficient (min) is higher than C2 (YES in S220), Main_RSL and SD_RSL are highly correlated with each other, and therefore the sub received signal does not function to complement the main received signal. When being influenced by a change in natural environment such as fading in this state, the reception side wireless communication apparatus 120 causes out of frame. In this case, a factor that out of frame occurs when the sub received signal does not complement the main received signal is estimated as an occurrence of interference fading.

In this regard, the interference fading can be classified into following small delay difference interference fading and large delay difference interference fading according to a delay difference between a desired wave and an interference wave. The small delay difference interference fading (short-echo selective fading) is interference fading where a delay difference between a desired wave and an interference wave is relatively small (e.g., the delay difference is Tdth or less). This small delay difference interference fading occurs when the K value (effective Earth-radius factor) decreases. In this regard, when the K value decreases, a clearance between a radio wave and a ground becomes insufficient. Hence, a path difference between a desired wave and an interference wave (a reflected wave reflected from the ground) decreases. By this means, the small delay difference interference fading which causes a relatively small delay difference between the desired wave and the interference wave occurs.

Meanwhile, the large delay difference interference fading (long-echo selective fading) is interference fading which causes a relatively large delay difference between the desired wave and the interference wave (e.g., the delay difference is higher than Tdth). This large delay difference interference fading occurs when fluctuation of the K value is small compared to a case where the small delay difference interference fading occurs. In this case, a clearance between a radio wave and a ground is secured. Hence, a path length difference between the desired wave and the interference wave does not decrease so much. By this means, the small delay difference interference fading which causes a relatively large delay difference between the desired wave and the interference wave occurs.

In this regard, as described above, when the small delay difference interference fading occurs, the K value decreases, and therefore the clearance between the radio wave and the ground is insufficient. Thus, Main_RSL and SD_RSL both decrease. Hence, RSLmax and RSLmin of both a main received signal and a sub received signal are relatively highly correlated with each other. Meanwhile, when the large delay difference interference fading occurs, the clearance between the radio wave and the ground is secured, and therefore Main_RSL and SD_RSL are not suppressed. Hence, RSLmax and RSLmin of the main received signal and the sub received signal are not highly correlated. A method for deciding whether a failure factor is the small delay difference interference fading or the large delay difference interference fading by using this property will be described below.

The failure factor deciding unit 220 calculates the correlation coefficients (correlation coefficients (Main)) indicating the correlations between Main_RSLmax and Main_RSLmin of the M period files (step S232). In other words, the failure factor deciding unit 220 calculates an index obtained from both of the received signal levels of the main receiver 124 and the sub receiver 128 by using both of the received signal levels. More specifically, the failure factor deciding unit 220 calculates the correlation coefficients (Main) between Main_RSLmax (i.e., the M Main_RSLmax values) of the respective M period files and Main_RSLmin (i.e., the M Main_RSLmin values) of the respective M period files. In this regard, a method for calculating the correlation coefficients (Main) is the same as the processing in S116.

Further, the failure factor deciding unit 220 calculates correlation coefficients (correlation coefficients (SD)) indicating correlations between SD_RSLmax and SD_RSLmin of the M period files (step S234). In other words, the failure factor deciding unit 220 calculates an index obtained from both of the received signal levels of the main receiver 124 and the sub receiver 128 by using both of the received signal levels. This processing in S234 is performed in parallel to processing in S232 or before or after the processing in S232. More specifically, the failure factor deciding unit 220 calculates the correlation coefficients (SD) between SD_RSLmax (i.e., M SD_RSLmax values) of the respective M period files and SD_RSLmin (i.e., the M SD_RSLmin values) of the respective M period files. In this regard, a method for calculating the correlation coefficients (SD) is the same as the processing in S116.

Next, the failure factor deciding unit 220 decides whether or not the correlation coefficients (Main) calculated by the processing in S232 is higher than C3 and the correlation coefficients (SD) calculated by the processing in S234 is higher than C3 (S240). In this regard, C3 is a threshold (first threshold) for deciding whether interference fading which has occurred is the large delay difference interference fading or the small delay difference interference fading, and is, for example, C3=0.3. In this regard, this C3 can be arbitrarily set in advance by the user. In this regard, by changing a setting value of this C3, Tdth which is a delay difference threshold can also fluctuate.

When the correlation coefficients (Main) are higher than C3 and the correlation coefficients (SD) are higher than C3 (YES in S240), the failure factor deciding unit 220 decides that RSLmax and RSLmin of both the main received signal and the sub received signal are relatively highly correlated with each other. Hence, the failure factor deciding unit 220 decides that an occurrence factor (failure factor) of the out of frame which has occurred is the small delay difference interference fading (step S242).

Meanwhile, when the correlation coefficients (Main) are C3 or less or the correlation coefficients (SD) are C3 or less (NO in S240), the failure factor deciding unit 220 decides that RSLmax and RSLmin are not highly correlated with each other. Hence, the failure factor deciding unit 220 decides that an occurrence factor (failure factor) of out of frame which has occurred is the large delay difference interference fading (step S244).

The failure factor deciding unit 220 performs the above processing per period file included in the history data obtained by the history data obtaining unit 210.

Thus, the failure factor deciding unit 220 decides the failure factor, so that the user can take an appropriate countermeasure for each failure factor. Consequently, it is possible to further increase an effect of the countermeasure.

In this regard, a countermeasure for the large delay difference interference fading is, for example, a method for adjusting an interval between the main antenna 122 and the sub antenna 126. Further, the countermeasure for the small delay difference interference fading is, for example, a method for adjusting the interval between the main antenna 122 and the sub antenna 126 first and lifting positions of the main antenna 122 and the sub antenna 126 to secure a clearance when the effect is insufficient.

Thus, the failure factor deciding unit 220 can further subdivide and classify interference fading and decide a type of the interference fading, so that it is possible to take an appropriate countermeasure for the classified interference fading. Further, even when a failure occurrence time (the error time Te and the non-operation time Tu) is not a long time, it is possible to appropriately decide various failure factors by using the out of frame second (OFS) Tof, and take appropriate countermeasures according to various situations.

Figure 8:
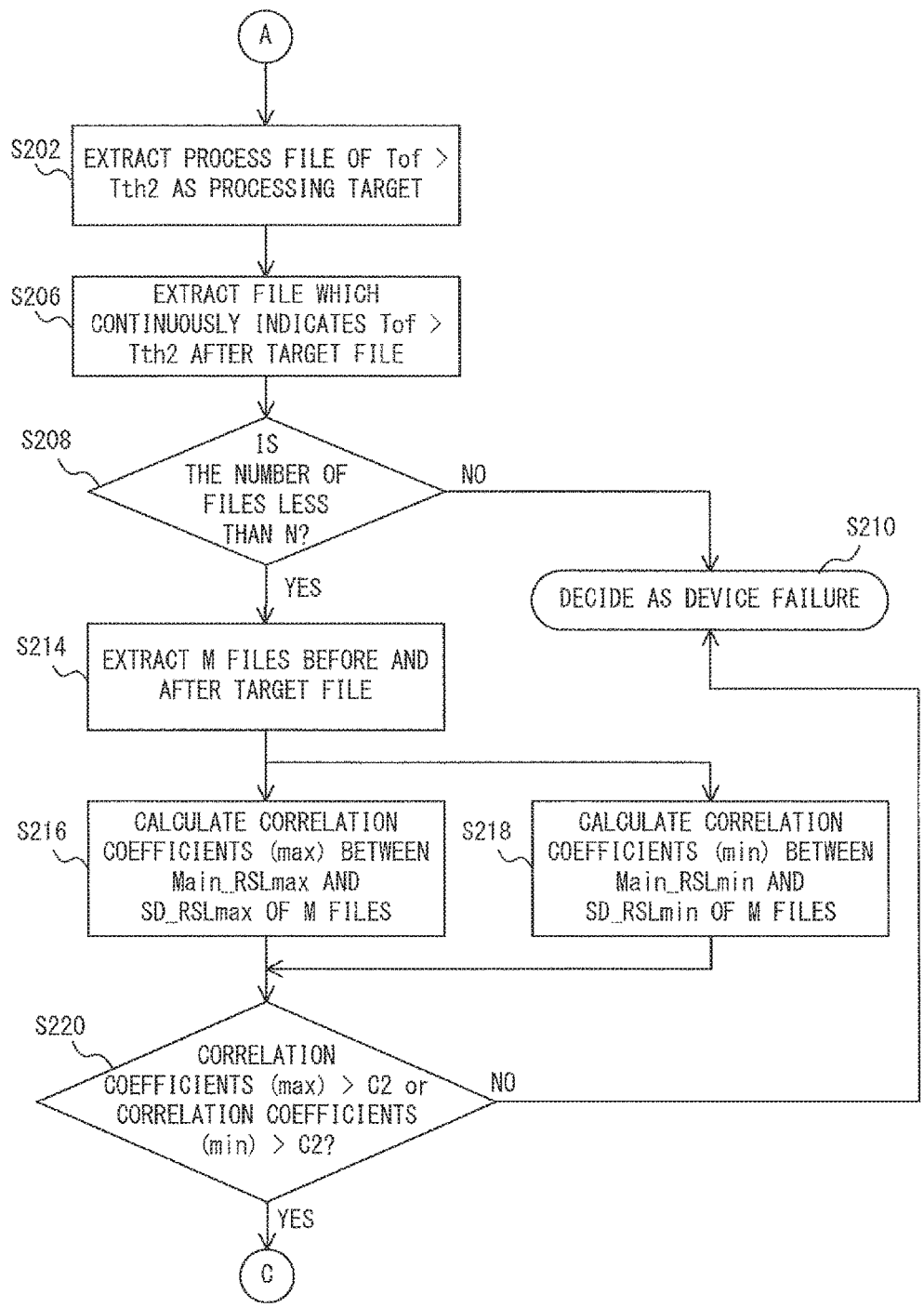
FIG. 8 is a flowchart illustrating processing performed by the failure factor deciding unit according to the first exemplary embodiment.
Figure 9:
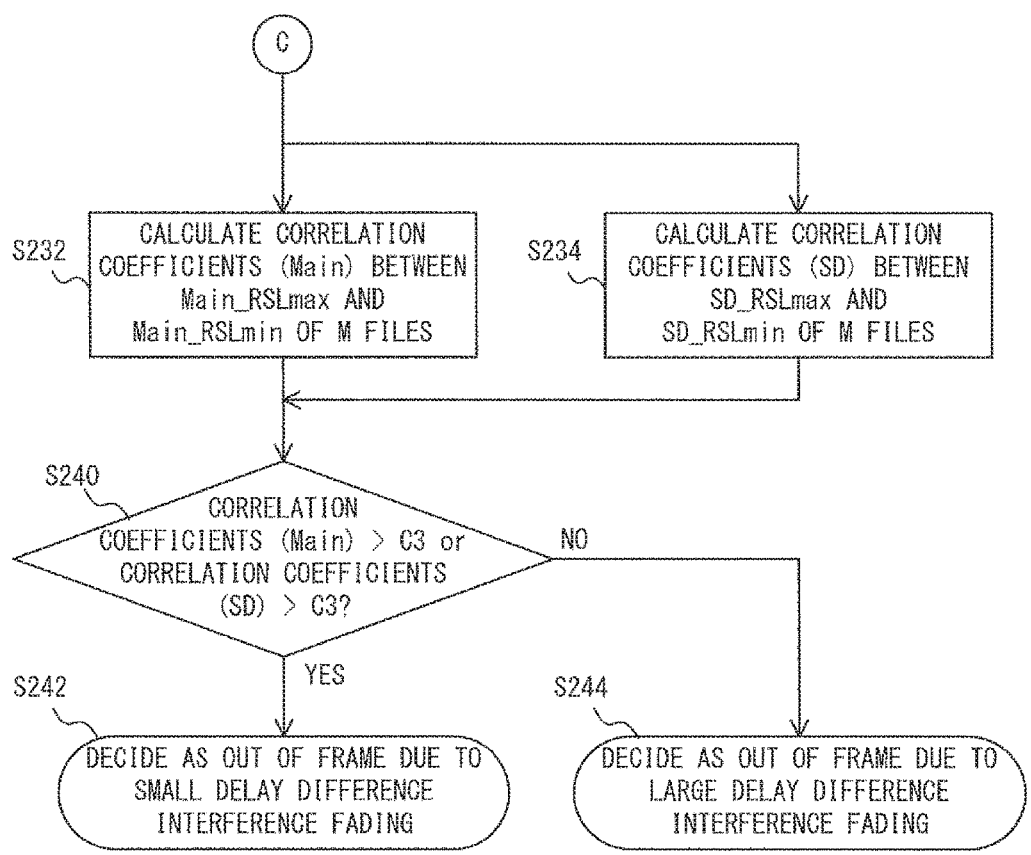
FIG. 9 is a flowchart illustrating processing performed by the failure factor deciding unit according to the first exemplary embodiment.
Figure 12:
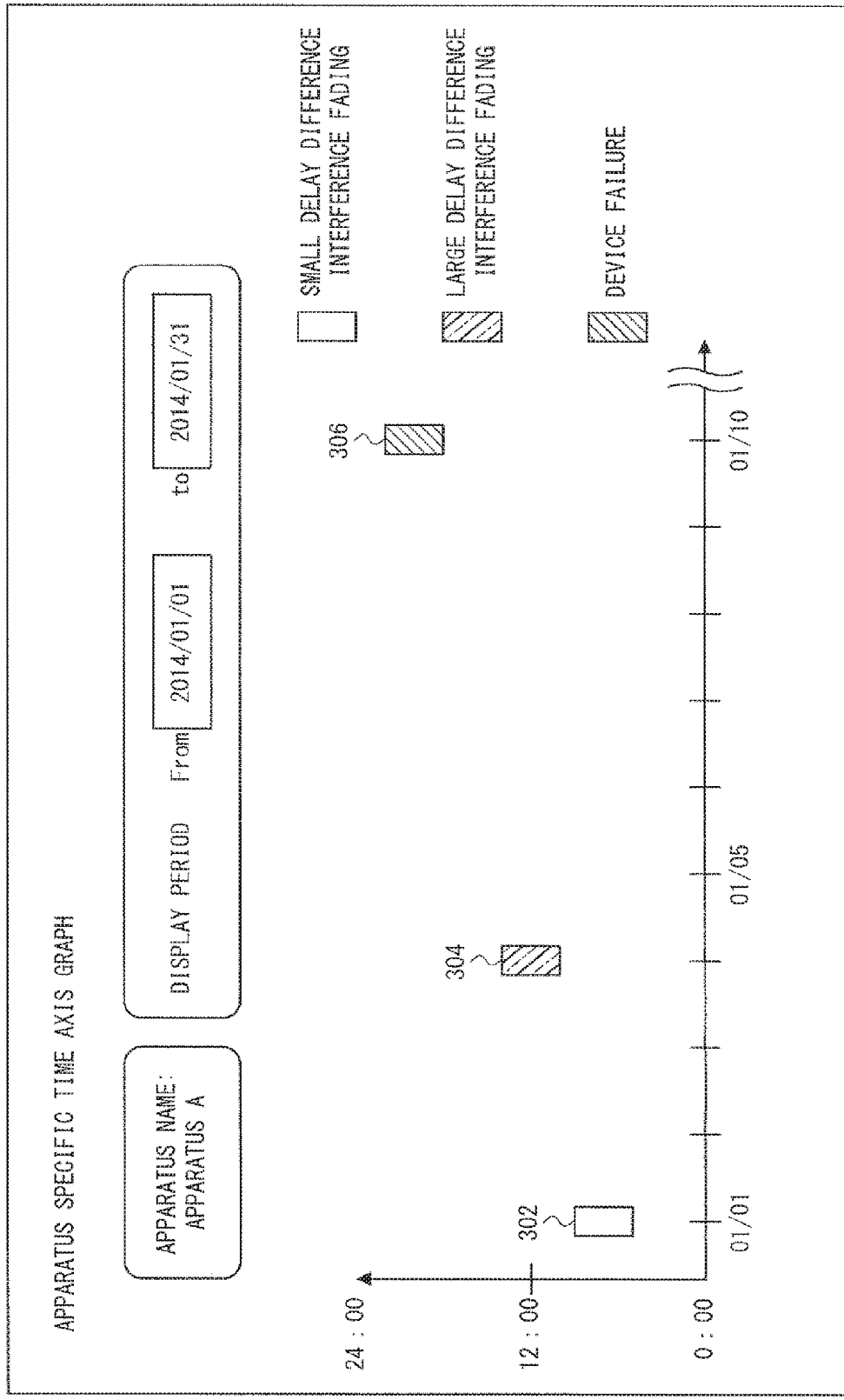
FIG. 12 is a view illustrating an apparatus specific time axis graph displayed by the decision result display unit according to the first exemplary embodiment.

The decision result display unit 230 displays the decision result obtained by the failure factor deciding unit 220 on a display apparatus provided in the monitoring apparatus 200 or another apparatus. More specifically, the decision result display unit 230 causes the display apparatus to display screens illustrated in FIGS. 10, 11 and 12, for example. In this regard, the display apparatus is, for example, a monitor. Further, the display apparatus may be a GUI (Graphical User Interface). That is, the display apparatus may be integrated with the input apparatus such as the mouse or may be a touch panel or a touch screen. In this regard, the screens illustrated in FIGS. 10, 11 and 12 are independent from each other, and do not necessarily correspond to each other. In this regard, FIGS. 10, 11 and 12 illustrate examples where the decision results illustrated in FIGS. 8 and 9 are displayed. However, the decision results illustrated in FIGS. 6 and 7 can be also displayed likewise.

FIG. 10 is a view illustrating a failure factor list displayed by the decision result display unit 230 according to the first exemplary embodiment. The failure factor list shows which failure factor has occurred for how long in a display period set by the user per apparatus. In an example in FIG. 10, the display period is a period from Jan. 1 to Jan. 31, 2014. Each of apparatuses A to E is any one of the wireless communication apparatuses 120-1 to 120-n, respectively.

FIG. 10 shows an example where, for example, in the apparatus A, the "small delay difference interference fading" has occurred for 60 minutes in total in the period. Similarly, in the apparatus B, the "large delay difference interference fading" has occurred for 45 minutes in total in the period. Further, in the apparatus E, the "device failure" has occurred for 30 minutes in total in the period. Thus, the decision result display unit 230 displays the failure factor list, so that the user can immediately check which failure factor has occurred in which wireless communication apparatus 120.

FIG. 11 is the view illustrating an apparatus specific list displayed by the decision result display unit 230 according to the first exemplary embodiment. The apparatus specific list indicates failure factors which have occurred in chronological order per apparatus selected by the user. The apparatus specific list may be displayed by, for example, touching or clicking a position of the "apparatus A" in FIG. 10.

FIG. 11 illustrates an example where, for example, small delay difference interference fading has occurred in a period of 15 minutes from 8:00 to 8:15 on Jan. 1, 2014. Similarly, large delay difference interference fading has occurred in a period of 15 minutes from 12:00 to 12:15 on Jan. 4, 2014. Thus, the decision result display unit 230 displays the apparatus specific list, so that the user can immediately check which fading has occurred when and how long the fading has occurred in the selected wireless communication apparatus 120.

FIG. 12 is the view illustrating an apparatus specific time axis graph displayed by the decision result display unit 230 according to the first exemplary embodiment. The apparatus specific time axis graph is illustrated by displaying the apparatus specific list in FIG. 11 by using a graph. The apparatus specific time axis graph is illustrated by indicating a date on a horizontal axis and a time of one day on a vertical axis, and displaying which failure factor has occurred in which time zone of one day by using bars 302 to 306. The bars 302 to 306 are, for example, colored-coded per corresponding failure factor. In this regard, the lengths of the bars 302 to 306 in a vertical direction may correspond to periods in which corresponding failure factors have occurred.

FIG. 12 illustrates an example where, for example, the bar 302 indicates that small delay difference interference fading has occurred in the morning (dawn) on January 1. Further, the bar 304 indicates that large delay difference interference fading has occurred at noon on January 4. Furthermore, the bar 306 indicates that a device failure has occurred in the afternoon (evening) on January 10.

Thus, the decision result display unit 230 displays the apparatus specific time axis graph, so that the user can immediately visually check in which time zone of one day each failure factor has occurred. Further, the decision result display unit 230 may display a pop-up of each of countermeasures corresponding to the bars 302 to 306 by, for example, overlaying a mouse cursor (pointer) on the bars 302 to 306. By, for example, overlaying the mouse cursor on the bar 302, the countermeasure for the above small delay difference interference fading is displayed. By so doing, the user can immediately recognize the countermeasure for each failure factor.

Further, the decision result display unit 230 may display, as a graph, items of history data (performance parameters) corresponding to the bars 302 to 306, respectively by, for example, clicking the bars 302 to 306. By, for example, clicking the bar 302, graphs (line graphs) indicating changes in the error time Te, the non-operation time Tu, the out of frame second Tof, Main_RSLmin, Main_RSLmax, SD_RSLmin and SD_RSLmax in a period corresponding to the bar 302 are displayed. By so doing, the user can easily visually check actual history data in the period in which a failure factor has occurred.

Modified Example

In this regard, the present invention is not limited to the above exemplary embodiment, and can be optionally changed without departing from the scope of the present invention. For example, a processing (step) order can be optionally changed in the above flowchart. Further, one or more of a plurality of types of processing (steps) may be omitted.

Furthermore, in the above exemplary embodiment, in processing in S120, a failure factor deciding unit 220 decides a failure factor by using a correlation coefficient calculated by processing in S116 and S118, i.e., by using a correlation coefficient calculated for a target period file. However, the failure factor deciding unit 220 is not limited to such processing. The failure factor deciding unit 220 may not only calculate a correlation coefficient calculated for a target period file but also extract M files in processing in S114 and calculate correlation coefficients in the processing S116 and S118 for a plurality of period files after the target period file (or before or after the target period file), too, and calculate an average of these correlation coefficients. Further, the failure factor deciding unit 220 may use the average value of the calculated correlation coefficients for processing in S120.

When, for example, "2014/01/01_7:15" in the example in FIG. 4 is the target period file, the failure factor deciding unit 220 may not only calculate correlation coefficients of M period files before and after the period file "2014/01/01_7: 15", but also calculate correlation coefficients of the M period files before and after the period file "2014/01/01_7:30" and the M period files before and after the period file "2014/01/01_7:45" and calculate an average of the correlation coefficients of these three. By so doing, it is possible to more accurately decide a failure factor. In this regard, the average of the correlation coefficients may be calculated when target period files in the processing in S106 are successive.

In this regard, the above is applied likewise to processing in S220 and S240, too.

Further, in the above exemplary embodiment, a period related to period files is 15 minutes (defined by ITU-T) yet is not limited to 15 minutes. The period related to period files may be shorter or longer than 15 minutes. In this regard, generally, fading occurs in a short time, and therefore it is possible to more accurately specify when fading occurs by shortening a period related to period files.

Further, the number of period files M before and after a target period file extracted by the processing in S114 and S214 is not limited to 25. When the number of samples M is increased, it is possible to more accurately calculate the correlation coefficients. In this regard, when the period related to the period files is shortened as described above, even if samples of period files which are obtained during three hours (six hours in total) before and after a target period file are extracted in a similar way to the above exemplary embodiment, it is possible to extract samples of more period files compared to the above exemplary embodiment.

Further, in the above exemplary embodiment, values of N used in processing in S108 and S208 are the same as each other. However, the values of N used in the processing in S108 and S208 may be different from each other. Furthermore, in the above exemplary embodiment, values of M used in the processing in S114 and S214 are the same as each other. However, the values of M used in the processing in S114 and S214 may be different from each other.

Still further, a threshold for deciding whether or not correlation coefficients (max) and correlation coefficients (min) are high (i.e., whether or not correlations are high) in the processing in S120 is the same (C1) between the correlation coefficients (max) and the correlation coefficients (min). However, the threshold is not limited to this. The threshold C1 may differ between the correlation coefficients (max) and the correlation coefficients (min). This applies likewise to C2 in processing in S220. A threshold for deciding whether or not correlation coefficients (Main) and correlation coefficients (SD) are high (i.e., whether or not correlations are high) in the processing in S240 is the same (C3) between the correlation coefficients (Main) and the correlation coefficients (SD). However, the threshold is not limited to this. The threshold C3 may differ between the correlation coefficients (Main) and the correlation coefficients (SD).

Further, in the above exemplary embodiment, as illustrated in FIGS. 10 to 12, a decision result display unit 230 displays small delay difference interference fading, large delay difference interference fading and a device failure as failure factors. However, the decision result display unit 230 is not limited to such a configuration. The decision result display unit 230 does not need to display all of these failure factors, and may not display the device failure, for example. Meanwhile, the decision result display unit 230 may display at least one of transmission side output cut (S105), an antenna interval adjustment failure (S122) and another factor (S124).

Further, when a N+1 scheme is applied to a wireless communication apparatus to provide a plurality of frequency channels, the wireless communication apparatus may separately generate history data per frequency channel. In this case, the monitoring apparatus may separately decide a failure factor per frequency channel. Further, in this case, the decision result display unit 230 may separately display a failure factor which has occurred per frequency channel in an apparatus specific list illustrated in FIG. 11. Similarly, the decision result display unit 230 may separately display an apparatus specific time axis graph illustrated in FIG. 12 per frequency channel.

Further, FIG. 12 shows which failure factor has occurred in which time zone by using a graph for only a wireless communication apparatus 120 selected by the user. However, the graph is not limited to such a configuration. It is possible to display graphs of the other party wireless communication apparatus 120 which the selected wireless communication apparatus 120 communicates with side by side with graphs related to the selected wireless communication apparatuses 120. Generally, when some failure factor occurs in the selected wireless communication apparatus 120, the same failure factor occurs in the other party wireless communication apparatus 120 of the selected wireless communication apparatus 120. However, when a tendency of a failure factor which has occurred is different, it is decided that another abnormality has occurred. Hence, by displaying graphs related to the selected wireless communication apparatuses 120 and graphs related to the other party wireless communication apparatus 120 side-by-side, the user can more accurately decide a failure factor.

Further, in the above exemplary embodiment, a SD scheme is applied to the wireless communication apparatus 120. However, the SD scheme does not need to be applied to all wireless communication apparatuses 120 in a wireless communication system 100 illustrated in FIG. 2. In this regard, the failure factor deciding unit 220 decides a failure factor for the wireless communication apparatuses 120 to which the SD scheme is applied.

Further, in the above exemplary embodiment, as illustrated in FIG. 3, a synthesizer 130 in the wireless communication apparatus 120 synthesizes a main received signal and a sub received signal. However, the wireless communication apparatus 120 may not include a synthesizer. In this case, a demodulator 132 generally performs processing of demodulating a radio wave by using a main received signal of a main receiver 124. Meanwhile, when a RSL of the main receiver 124 is smaller than a predetermined threshold, the demodulator 132 performs processing of demodulating a radio wave by using a sub received signal of a sub receiver 128.

Further, the number of monitoring apparatuses is not limited to one and may be plural. Furthermore, in the above exemplary embodiment, the monitoring apparatus is configured by one apparatus yet is not limited to such a configuration. A function of the monitoring apparatus may be configured to be dispersed in a plurality of apparatuses connected to each other via a network such as the Internet by using a technique such as cloud computing or grid computing. For example, one apparatus may be configured to obtain history data from wireless communication apparatuses 120-1 to 120-n, another apparatus may be configured to decide a failure factor and still another apparatus may be configured to display a decision result. Further, still another apparatus may set a numerical value such as "M" which the user can arbitrarily set. Furthermore, there may be a plurality of apparatuses employing the same configuration, and a plurality of apparatuses may realize one or a plurality of functions. The present invention includes such a configuration, too.

Further, in the above exemplary embodiment, the monitoring apparatus obtains history data from the wireless communication apparatus yet is not limited to such a configuration. The monitoring apparatus may obtain information indicating a main received signal level and a sub received signal level from the wireless communication apparatus instead of the history data.

Further, the present invention has been described as a hardware configuration in the above exemplary embodiment. However, the present invention is not limited to this. The present invention can also realize processing of each component in the monitoring apparatus by causing a CPU (Central Processing Unit) to execute a computer program.

In the above example, the program can be stored by using various types of non-transitory computer readable media, and be supplied to the computer. The non-transitory computer readable media include various types of tangible storage media. The non-transitory computer readable media include, for example, magnetic recording media (e.g., flexible disks, magnetic tapes and hard disk drives), magnetooptical recording media (e.g., optical magnetic disks), CD-ROMs (Read Only Memory), CD-Rs, CD-R/Ws and semiconductor memories (e.g., mask ROMs, PROMs (Programmable ROM), EPROMs (Erasable PROM), flash ROMs and RAMs (Random Access Memory)). Further, the programs may be supplied to the computers by various types of transitory computer readable media. The transitory computer readable media include, for example, electrical signals, optical signals and electromagnetic waves. The transitory computer readable media can supply the programs to the computers via wired communication channels such as electrical cables or optical wires or wireless communication channels.

The present invention has been described above with reference to the embodiments. However, the present invention is not limited to the above. The configurations and the details of the present invention can be variously changed within the scope of the invention as long as one of ordinary skill in the art can understand the changes.

This application claims priority to Japanese Patent Application No. 2015-030605 filed on Feb. 19, 2015, the entire contents of which are incorporated by reference herein.

REFERENCE SIGNS LIST

1 MONITORING APPARATUS
12 OBTAINING UNIT
14 DECIDING UNIT
20 WIRELESS COMMUNICATION APPARATUS
22 FIRST RECEIVER
24 SECOND RECEIVER
100 WIRELESS COMMUNICATION SYSTEM
120 WIRELESS COMMUNICATION APPARATUS
124 MAIN RECEIVER
128 SUB RECEIVER
130 SYNTHESIZER
200 MONITORING APPARATUS
210 HISTORY DATA OBTAINING UNIT
220 FAILURE FACTOR DECIDING UNIT
230 DECISION RESULT DISPLAY UNIT

The invention claimed is:
1. A monitoring apparatus comprising:
at least one memory storing instructions, and
at least one processor configured to execute the instructions to:
obtain a history related to a received signal level of one or more first receivers and a received signal level of one or more second receivers in a predetermined period from a wireless communication apparatus including the first receiver and the second receiver, the history indicating at least information related to a maximum value and a minimum value of the received signal level of the first receiver and a maximum value and a minimum value of the received signal level of the second receiver in the predetermined period; and
decide a factor of a failure that has occurred in the wireless communication apparatus based on a correlation coefficient between the maximum value of the received signal level of the first receiver and the maximum value of the received signal level of the second receiver, and a correlation coefficient between the minimum value of the received signal level of the first receiver and the minimum value of the received signal level of the second receiver.

2. The monitoring apparatus according to claim 1, wherein the at least one processor is further configured to execute the instructions to decide a type of fading that has occurred in the wireless communication apparatus based on a correlation coefficient between the maximum value and the minimum value of the received signal level of the first receiver and a correlation coefficient between the maximum value and the minimum value of the received signal level of the second receiver.

3. The monitoring apparatus according to claim 2, wherein the at least one processor is further configured to execute the instructions to:
decide that interference fading that causes a small delay difference between a desired wave and an interference wave has occurred when the correlation coefficient between the maximum value and the minimum value of the received signal level of the first receiver and the correlation coefficient between the maximum value and the minimum value of the received signal level of the second receiver are higher than a predetermined first threshold, and
decide that interference fading that causes a large delay difference between the desired wave and the interference wave has occurred when at least one of the correlation coefficient between the maximum value and the minimum value of the received signal level of the first receiver and the correlation coefficient between the maximum value and the minimum value of the received signal level of the second receiver is the predetermined first threshold or less.

4. The monitoring apparatus according to claim 2, wherein
the history includes a time at which the failure has occurred in the predetermined period, and
the at least one processor is further configured to execute the instructions to decide the type of the fading in a period in which out of frame has occurred longer than a predetermined threshold time.

5. The monitoring apparatus according to claim 1, wherein the at least one processor is further configured to execute the instructions to display a decision result on a display apparatus.

6. The monitoring apparatus according to claim 5, wherein the at least one processor is further configured to execute the instructions to display which failure factor has occurred per each wireless communication apparatus.

7. The monitoring apparatus according to claim 5, wherein the at least one processor is further configured to execute the instructions to display which failure factor has occurred in the predetermined period.

8. The monitoring apparatus according to claim 5, wherein the at least one processor is further configured to execute the instructions to display which failure factor has occurred at a given time of a given date in a graph including an axis indicating a date and an axis indicating a time of the date.

9. A failure factor deciding method comprising:
obtaining a history related to a received signal level of one or more first receivers and a received signal level of one or more second receivers in a predetermined period from a wireless communication apparatus including the first receiver and the second receiver, the history indicating at least information related to a maximum value and a minimum value of the received signal level of the first receiver and a maximum value and a minimum value of the received signal level of the second receiver in the predetermined period; and
deciding a factor of a failure that has occurred in the wireless communication apparatus based on a correlation coefficient between the maximum value of the received signal level of the first receiver and the maximum value of the received signal level of the second receiver, and a correlation coefficient between the minimum value of the received signal level of the first receiver and the minimum value of the received signal level of the second receiver.

10. The failure factor deciding method according to claim 9, wherein a type of fading that has occurred in the wireless communication apparatus is decided based on a correlation coefficient between the maximum value and the minimum value of the received signal level of the first receiver and a correlation coefficient between the maximum value and the minimum value of the received signal level of the second receiver.

11. The failure factor deciding method to claim 10, wherein
it is decided that interference fading that causes a small delay difference between a desired wave and an interference wave has occurred when the correlation coefficient between the maximum value and the minimum value of the received signal level of the first receiver and the correlation coefficient between the maximum value and the minimum value of the received signal level of the second receiver are higher than a predetermined first threshold, and
it is decided that interference fading that causes a large delay difference between the desired wave and the interference wave has occurred when at least one of the correlation coefficient between the maximum value and the minimum value of the received signal level of the first receiver and the correlation coefficient between the maximum value and the minimum value of the received signal level of the second receiver is the predetermined first threshold or less.

12. The failure factor deciding method according to claim 10, wherein
the history includes a time at which the failure has occurred in the predetermined period, and
the type of the fading is decided in a period in which out of frame has occurred longer than a predetermined threshold time.

13. The failure factor deciding method according to claim 9, further comprising displaying a decision result of the decision on a display apparatus.

14. The failure factor deciding method according to claim 13, wherein which failure factor has occurred is displayed per each wireless communication apparatus.

15. The failure factor deciding method according to claim 13, wherein which failure factor has occurred is displayed in the predetermined period.

16. The failure factor deciding method according to claim 13, wherein which failure factor has occurred at a given time of a given date is displayed in a graph including an axis indicating a date and an axis indicating a time of the date.

17. A monitoring apparatus comprising:
hardware, including a processor and memory,
wherein the monitoring apparatus determines, by using at least the hardware, a type of a communication failure based on an index, the index being obtained based on received signal levels of first and second receivers obtained from a wireless communication apparatus including the first receiver and the second receiver that are electrically connected to different antennas from each other,
wherein the monitoring apparatus calculates, by using at least the hardware, the index by using a correlation between the received signal levels of the first and second receivers, and
wherein the correlation between the received signal levels includes a correlation between a maximum value of the received signal level of the first receiver and a maximum value of the received signal level of the second receiver, and a correlation between a minimum value of the received signal level of the first receiver and a minimum value of the received signal level of the second receiver.

18. The monitoring apparatus according to claim 17, wherein the monitoring apparatus calculates, by using at least the hardware, the index according to magnitude of the correlation.

* * * * *